United States Patent [19]
Kawakami et al.

[11] Patent Number: 5,217,814
[45] Date of Patent: Jun. 8, 1993

[54] SINTERED SLIDING MATERIAL

[75] Inventors: Shinya Kawakami; Shinichi Miziguchi; Tatsuhiko Fukuoka; Yasunori Kabeya; Keiichi Shimasaki, all of Aichi, Japan

[73] Assignee: Taiho Kogyo Co., Ltd., Aichi, Japan

[21] Appl. No.: 831,249

[22] Filed: Feb. 7, 1992

[30] Foreign Application Priority Data

Feb. 9, 1991 [JP] Japan .................................. 3-037820
Oct. 9, 1991 [JP] Japan .................................. 3-290578
Mar. 2, 1992 [JP] Japan .................................. 4-047544

[51] Int. Cl.$^5$ ............................. B22F 3/24; B22F 7/00
[52] U.S. Cl. ....................................... 428/545; 428/546; 75/231; 75/243; 75/244; 75/247
[58] Field of Search ................. 75/231, 243, 244, 246; 428/547, 551, 559, 561, 565, 545

[56] References Cited

U.S. PATENT DOCUMENTS

| | | | |
|---|---|---|---|
| 3,705,450 | 12/1972 | Morisaki | 428/545 |
| 3,883,314 | 5/1975 | Schnyder et al. | 29/182.5 |
| 3,914,178 | 10/1975 | Fineran et al. | 252/12 |
| 4,208,472 | 6/1980 | Cho et al. | 428/550 |
| 4,505,987 | 3/1985 | Yamada et al. | 428/552 |
| 4,655,944 | 4/1987 | Mori | 252/12.2 |
| 4,666,787 | 5/1987 | Bickle et al. | 428/550 |
| 4,680,161 | 7/1987 | Muto | 419/3 |
| 4,716,766 | 1/1988 | Baureis | 73/827 |
| 4,740,340 | 4/1988 | Pratt et al. | 264/171 |
| 5,024,882 | 6/1991 | Matucha et al. | 428/323 |
| 5,041,339 | 8/1991 | Mori et al. | 228/552 |
| 5,089,354 | 2/1992 | Nakashima et al. | 428/552 |

FOREIGN PATENT DOCUMENTS

| | | | |
|---|---|---|---|
| 44577 | 1/1982 | European Pat. Off. | 428/550 |
| 53-36856 | 5/1978 | Japan . | |
| 55-106230 | 8/1980 | Japan . | |
| 61-192738 | 8/1986 | Japan . | |
| 63-37445 | 7/1988 | Japan . | |
| 2139236 | 11/1984 | United Kingdom . | |

Primary Examiner—Donald P. Walsh
Assistant Examiner—Nguoclan T. Mai
Attorney, Agent, or Firm—Armstrong, Westerman, Hattori, McLeland & Naughton

[57] ABSTRACT

The wear resistance and seizure resistance of the sliding material consisting of a metal backing, a Cu-based sintered layer, and resin and solid lubricant filled in the pores of the sintered layer are improved by determining the following features (a) multi-layer Cu particles; from 30 to 200 μm of the diameter of the Cu particles; porosity of from 5 to 70% of the sintered layer; resin, $MoS_2$ and graphite filled in the pores.

17 Claims, 5 Drawing Sheets

SINTERED SLIDING MATERIAL

BACKGROUND OF INVENTION

1. Field of Invention

The present invention relates to a sliding material having improved sliding properties under a mixed lubricating condition and a boundary lubricating condition. More particularly, the present invention relates to a sintered sliding material, which consists of metal backing, a Cu or Cu-alloy layer sintered on the metal backing, and resin and solid lubricant which are filled in the pores formed in the sintered layer around the particles of the Cu or Cu-alloy.

2. Description of Related Arts

It is known from Japanese Unexamined Patent Publication No. 55-106,230 that 30% by weight or less of polyimide and such lubricating additives as molybdenum disulfide and graphite can be filled in the pores of a sponge metal, e.g., Cu, having porosity of from 88 to 98%. The sponge metal having a very large porosity is the substrate material which supports the filled materials. As is described in said publication, the blanking of the sponge metal is usually necessary for shaping it into the form of a bearing. The recovery of the workpieces by the blanking is, however, disadvantageously low. In addition, the formability of the sponge metal is poorer than that of the sliding material which comprises the metal backing.

Japanese Examined Patent Publication No. 63-37445 discloses a sintered sliding material of the type described above. That is, a Cu or Cu-alloy layer is sintered on the metal backing, and resin and solid lubricant are filled in the pores of the sintered layer. The surface of the sliding material is machined to expose the sintered metal and the filled material. The surfaces of the sintered metal and the filled material therefore form an essentially identical plane.

According to the method for producing the sliding material described in Japanese Examined Patent Publication No. 63-37445, an almost spheroidal lead-bronze powder, having a diameter of 0.18 mm, is sintered on the metal backing and then machined to provide a thickness of 0.11 mm. The thus machined sintered metal is exposed on the surface of the sliding metal at 40–60% of such surface. It is also disclosed in Japanese Examined Patent Publication No. 63-37445 that such solid lubricants as molybdenum disulfide and graphite are desirably limited to an amount of 30% by weight or less. In this case, the amount of the polyimide and polyamide-imide, having a high bonding strength, increases relative to the solid lubricant, and, thus, the effects of the solid lubricant are not outstanding.

Other drawbacks of the known sliding material are described with reference to FIG. 4.

EXPOSED AREA OF SINTERED LAYER

When the sintered layer is a mono-layer of metal particles and is subjected to machining, the exposed area of the sintered layer greatly varies depending upon the machining depth. The sliding properties of such sliding material are very unstable, because the exposed area of the sintered metal determines the sliding properties in such a manner that the metal contact between the sliding material and the opposed material increases with the increase in the exposed area, and, thus, wear-resistance is enhanced and seizure-resistance is lowered with the increase in the exposed area.

When the metal particles are piled on one another, a multi-layer sintered material is provided. In this case, if the metal particles are piled at the geometrically highest density, the exposed area of the sintered metal layer does not vary irrespective of the machining depth. In actuality, however, the exposed area of the sintered metal layer varies as is illustrated in FIG. 4.

Figure 4:
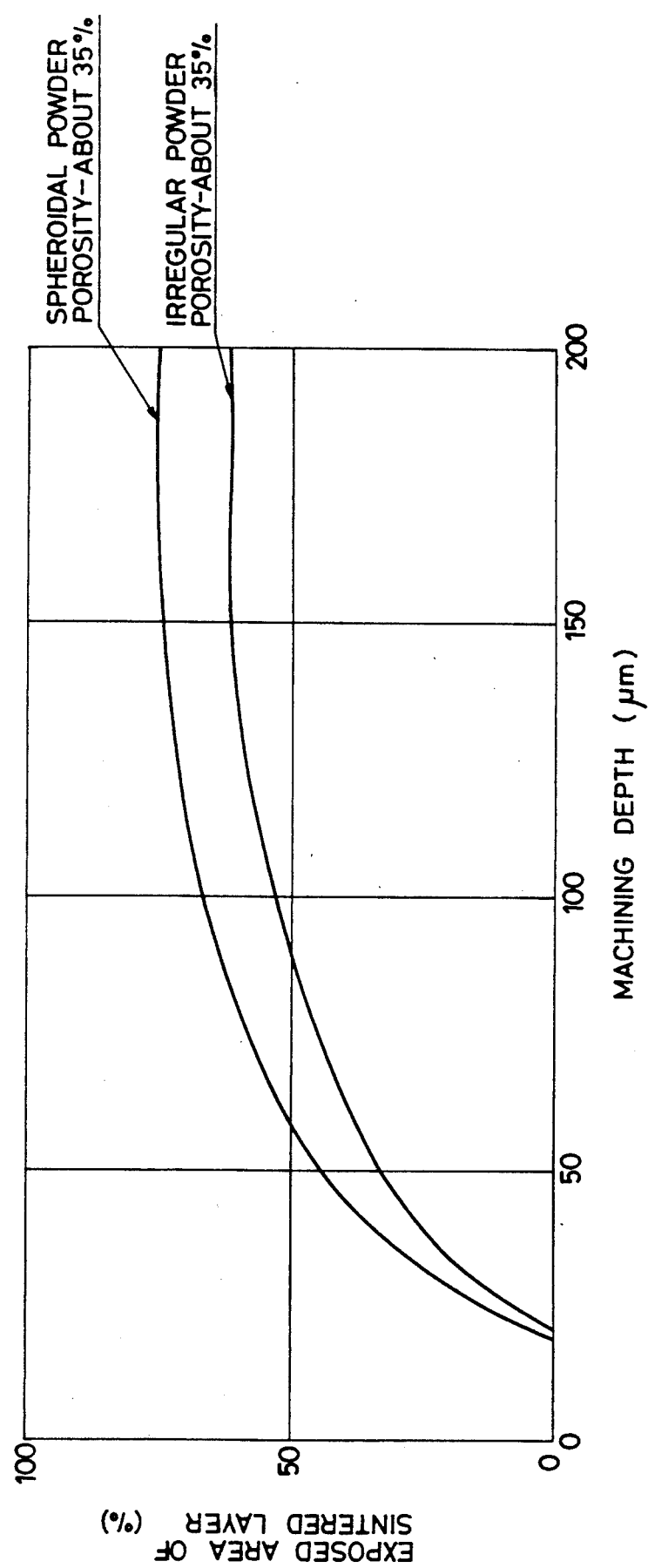
FIG. 4 is a graph illustrating the relationship between the exposed area of the sintered metal layer and the machining depth.

In FIG. 4, the sliding layer was prepared as follows. Spheroidal Cu powder having an average particle diameter of 110 $\mu$m was piled to form an almost three layered material (that is, two to three layers in all areas) and then sintered. The so-prepared sintered layer had a thickness of approximately 300 $\mu$m and approximately 35% by volume of porosity. The entire sintered layer was impregnated with resin in such a manner that the resin protruded above the surface of the sintered layer by a height of approximately 20 $\mu$m. The so-prepared sliding material was machined at a depth given in the abscissa of FIG. 4. The exposed area of the sintered layer dependent upon the machining depth is given in the ordinate of FIG. 4. As is clear from FIG. 4, it is necessary to machine, by a depth of 100 $\mu$m or more, the sintered particles piled on one another to form a multi-layered, material, in order to stabilize the exposed area of the sintered metal layer.

When the exposed area of the sintered metal monolayer is very low, e.g., approximately 20%, it would greatly vary when the machining depth shifts from the predetermined one. The siding properties vary therefore greatly between the production lots. In addition, when the resin wears out slightly during the sliding, the exposed area of the sintered layer abruptly increases, thereby greatly changing the sliding properties.

The change in the exposed area of the sintered layer may occur during the initial sliding period while the roughness of the sliding surface is not yet compaticle to that of the opposed material. This case is very disadvantageous, because either the sliding material or the opposed material may abruptly wear out due to the metal contacts therebetween, thereby causing seizure.

SUMMARY OF THE INVENTION

It is therefore an object of the present invention to provide a sliding material which can overcome the drawbacks of the heretofore known sliding materials, and which has the following features:

(1) the sliding properties are stable irrespective of slight variations in the machining depth of the sliding surface;

(2) seizure resistance does not abruptly deteriorate when the sliding surface slightly wears out; and, (3) wear-resistance and seizure-resistance are excellent under severe sliding conditions.

In accordance with the objects of the present invention, there is provided a sliding material, which comprises:

a metal backing;

multi-layer Cu or Cu-alloy particles sintered on said metal backing, consisting of metal particles from 30 to 200 μm in diameter and piled on one another in at least two layers; said metal particles forming a sintered layer having from 5 to 70% by volume of pores;

a resin and solid lubricant (hereinafter referred to as the additives) filled in said pores, said lubricant comprising from 30 to 80% by weight of molybdenum disulfide and graphite based on the weight of the additives; and, a machined surface at the top of the siliding material, consisting of said Cu or Cu-alloy in an amount of 95% or less based on the area of said machined surface, the balance being said additives.

DESCRIPTION OF PREFERRED EMBODIMENTS

The present invention is hereinafter described in detail.

The metal backing may be of any known kind.

The Cu or Cu-alloy of the sintered layer may be pure Cu or Cu alloys, such as bronze, lead bronze, and phosphor bronze. A powder of FeP, Al$_2$O$_3$ or the like may be dispersed in the Cu or Cu-alloy described above to provide composite material, which may also be used as the Cu-alloy in the present invention. The Cu or Cu alloy powder is sintered on the metal backing to form a sintered layer.

The Cu-based Powder is spheroidal, virtually spheroidal without sharp edges, or irregularly shaped, e.g., flaky, dendritic, chain-shaped or scalene polygonal.

When the irregular powder is used, 50% or more, preferably 70% or more of the total powder must be the irregular powder, whose ratio of short-diameter/long-diameter is from 0.2 to 0.7 whose ratio of short-diameter/long-diameter is from 0.2 to 0.7. When 50% or more of the total powder is the irregular powder, whose ratio of short-diameter/long diameter is more than 0.7, the effects of the irregular powder are not outstanding. On the other hand, when 50% or more of the total powder is the irregular powder, whose ratio of short-diameter/long diameter is 0.2 or less, pores of the total powder are so decreased that desirable filling density is not obtained. Since the pores are liable to be disadvantageously densely filled with this irregular powder, the amount of this irregular powder should desirably be limited to 30% or less, particulary 10% or less of the total powder.

The average size of the powder particles of the sintered layer is from 30 to 200 μm, preferably from 50 to 200 μm, and more preferably from 60 to 150 μm. The average long-diameter of the irregular powder must be from 30 to 200 μm. When this size is less than 30 μm, and, further, when the filling density of the powder is high, for example 5g/cc, it is difficult to impregnate the pores of sintered layer with the resin and solid lubricant. On the other hand, when this size is more than 200 μm, and, further, when the filling density of the powder is low, for example 2.5g/cc, the bonding strength of the Cu (alloy) particles of the sintered layer becomes disadvantageously low.

The porosity in volume % of the sintered layer is from 5 to 70%, preferably from 10 to 60%, and more preferably from 30 to 50%. When the porosity is less than 5%, the impregnated amount of the resin and solid lubricant is so reduced that such sliding properties as low-friction and lubrication property are impaired and thus seizure is liable to occur. On the other hand, when the porosity is more than 70%, the proportion of the sintered metal is so reduced that the strength is disadvantageously reduced.

The proportion of sintered metal on the sliding surface, i.e., the exposed area of the sintered layer, is 95% or less, s preferably 85% or less, and more preferably from 30 to 80%. When the exposed area of the sintered layer is more than 95%, the effects of the solid lubricant are not attained.

The preferred exposed area, in accordance with the application of the sliding material is: high area %, i.e., 60-80% for ordinary conditions; and, low area %, i.e., 40-60% for severe sliding conditions where seizure is likely to occur. This exposed area of the sintered layer exerts great influence on the surface properties of the sliding material at a portion thereof facing the opposite material. This was also an influencing factor in the known sliding material but greatly varied, depending upon the production conditions. Therefore, the intended sliding properties cannot be attained by controlling the exposed area of the sintered layer in the known material. Contrary to this in the present invention, since the multi-layer sintered metal particles are formed on the metal backing, great variation in the exposed area of the sintered layer can be prevented, and the sliding properties can be controlled by controlling the exposed area.

The porosity is smaller as the particle diameter of the powder gets smaller, because the sintering is liable to be promoted. However, when the large-diameter particles and small-diameter particles are mixed, such a mixed powder causes a reduction of porosity, although the average particle diameter of the mixed powder is the same as that of a powder having uniform particle diameter. The porosity described as a feature of the invention indicates an average porosity. The local porosity of the sintered layer varies and is large at the surface of the sliding layer as is shown in FIG. 4.

A feature of the sintered layer according to the present invention is the multi-layer of metal particles piled on one another. When the metal particles are dispersed on the metal backing but are not piled on one another, a mono-layer of metal particles is formed. When the mono-layer of metal particles is sintered and then machined on the surface of the sintered layer, it is difficult to attain by machining a stably constant exposed area of the sintered layer. In addition, parts of the metal particles may be separated from the metal backing after the sintering, and, therefore, the exposed area is unstable in the case of the mono-layer of metal particles. Contrary to this, in the case of the multi-layer metal particles, the exposed area of the sintered layer becomes stable provided that the surface of sintered layer is machined to a certain depth as is shown in FIG. 4.

Figure 5:
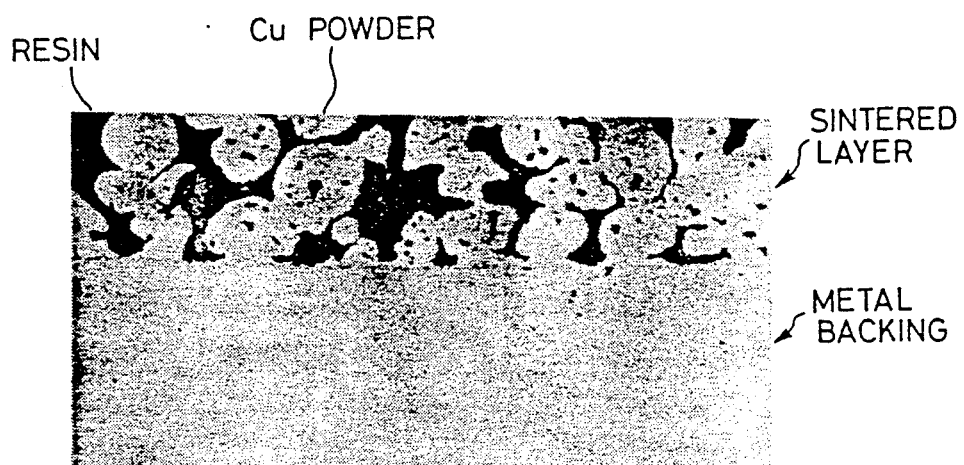
FIG. 5 is a photograph showing the sintered layer consisting of spheroidal Cu-based powder.
Figure 6:
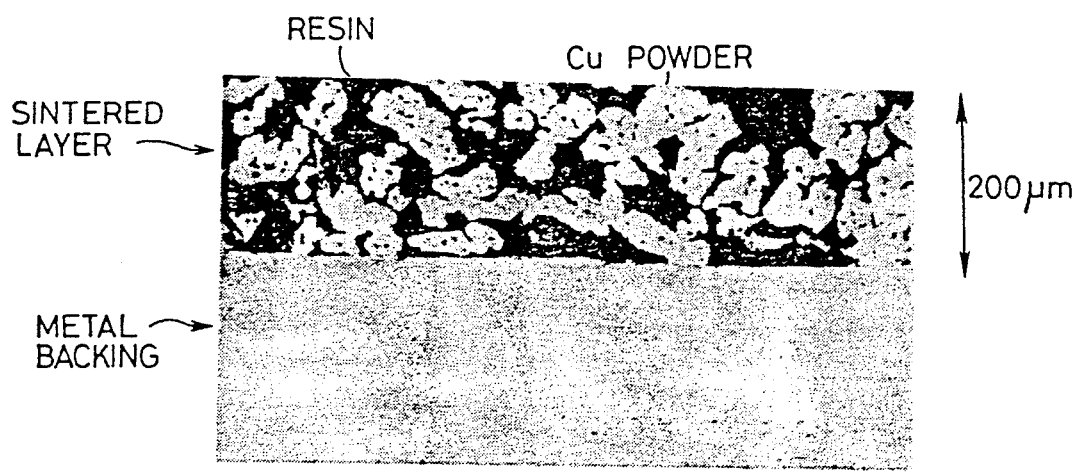
FIG. 6 is a photograph showing the sintered layer consisting of irregularly shaped Cu-based powder.

The sintered layer consisting of spheroidal metal particles as shown in FIG. 5 has a higher exposed area of the sintered layer as compared with the sintered layer consisting of irregularly shaped metal particles as shown in FIG. 6, by 15-20% over almost the entire range of the machining depth.

The dimension of the irregular powder shown in FIG. 6 is as follows.

| Average long-diameter - 90 μm Ratio of long-diameter/Short/diameter | Proportion (%) in total powder |
|---|---|
| less than 0.2 | 4 |
| 0.2-0.7 | 76 |
| more than 0.7 | 20 |

The filling density of the spheroidal metal particles is from 4.4 to 4.8 g/cc (volume of the sintered layer), while the filling density of the irregularly shaped metal particles is from 3.2 to 3.7 g/cc. The low filling density of the latter corresponds to the smaller exposed area of the latter, while the high filling density of the former corresponds to the large exposed area of the former. The exposed area of the irregularly shaped metal particles is from 30 to 60% at the machining depth of from 50 to 150 μm. This exposed area corresponds to the range of FIG. 1, where the seizure resistance is high.

The preferred average filling density of the irregularly shaped powder is from 2.5 to 4.0 g/cc, particularly from 2.8 to 3.7 g/cc. The average filling density in FIG. 6 is 3.5 g/cc.

The additives contain from 30 to 80% by weight, preferably from 35 to 55% by weight of molybdenum disulfide and graphite as the solid lubricant. The molybdenum disulfide enhances the seizure-resistance, and the graphite enhances the wear-resistance. When the solid lubricant is less than 30% by weight, the seizure and wear are likely to occur under mixed lubricating conditions and boundary lubricating conditions. On the other hand, when the solid lubrincant is more than 80% by weight, the molybdenum disulfide and the like are liable to be removed from the sliding material during use. The balance of the solid lubricant is the resin.

The molybdenum disulfide contained in the sliding layer is preferably in an amount of from 10 to 50% by weight, more preferably form 15 to 35% by weight. The molybdenum disulfide preferably has an average diameter of from 0.5 to 25 μm. The graphite contained in the sliding layer is preferably in an amount of from 2 to 40% by weight, more preferably from 15 to 30% by weight. The graphite preferably has an average diameter of from 8 to 35 μm. The graphite may be a natural or synthetized one. Isotropic synthetized graphite is preferable in the light of wear resistance.

For all or the major proportion of the resin, aromatic polyimide, its modified resin, such as polyamide-imide, polyether-imide, and polyester-imide, and phenol resing are s used. The proportion of the resin is preferably from 20 to 70% by weight based on the additives.

A solid lubricant other than the above mentioned, can also be included in the additives. Other solid lubricants can be tungsten disulfide (WS$_2$), BN, PTFE, iluorine plastics, or Pb. Their additive amount is from 3 to less than 20% by weight, preferably from 5 to 20% by weight. When a solid lubricant is used, the lowest content of molybdenum disulfide must be set at 20% by weight.

A method for producing the above described sliding material is hereinafter described.

A powder of lead bronze or the like, having particle diameter −100 mesh and +200 mesh, is dispersed on a steel backing to provide a thickness of approximately 300 μm. The bronze particles are piled into three particle-layers in this example. The sintering is carried out at 800° to 850° C. As a result, a sintered layer having a porosity of from approximately 40 to 50% is obtained. The steel backing, on which the sintered layer is bonded, is immersed in the liquid containing the solid lubricant and resin. It is necessary to thoroughly replace the air contained in the pores of the sintered layer with resin, because the remaining or non-replaced air may cause cracking when the workpiece is later subjected to drying. The liquid is stirred with a mixer to impregnate the pores of the sintered layer with the solids. According to another impregnating method, the solid lubricant and resin are mixed in liquid, and the liquid mixture is applied on the sintered layer.

Drying is then carried out at 150° C. for 30 minutes. The solvent of the resin vaporizes during drying. When the solvent is used in a great amount, the replacement of air in the sintered layer pores becomes easy. But, since the viscosity of the resin is lowered, vaporization of the solvent is so impeded as to elongate the drying time. In this regard, since the phenol resin has a low viscosity, for example, 2p, even if its solid content is as high as 60%, the air can be thoroughly replaced and the drying time can be shortened by using the s phenol resin. The drying time in the case of phenol resin can be shortened to 1/6 times as low as in the case of using polyamide-imide. As a result, the line speed of the drying plant can be enhanced and products free of swell and cracks can be produced.

After drying, baking is carried out at, for example, 300° C. for 30 minutes. Subsequently, the surface of the workpiece is removed by machining at a depth of approximately 100 μm from the surface. The sintered metal-layer is exposed by approximately 70% on the surface of the sliding layer.

In in order to obtain a sintered layer having 50% or more of porosity, the mixed powder of lead bronze and graphite are dispersed on the metal backing, and are sintered at 800°-850° C. in a hydrogen stream, and, then, the non-sintered remaining graphite powder is sucked up by a dust collector. In addition, the porosity of 50% or more of the sintered layer can be attained also by using subliming material, e.g., melamine cyanurate which sublimes at a temperature of from 300° to 500° C.

Non-sintered graphite can be used as the solid lubricant. In this case, none of it is sucked up by the dust collector.

Although lead bronze is described as an example of the sintered metal, other metals can be sintered in the same manner.

The sliding properties of the material according to the present invention are described from a theoretical aspect.

The additives adhere to the sintered layer of the sliding material which has been subjected to the seizure test described in the examples. When the solid lubricant is more than 30%, the amount of adhesion is greater than in the case where the solid lubricant is less than 30%. These facts can be construed as follows.

Heat generation at the sliding surface due to friction increases under severe sliding conditions. Resin, which has a higher coefficient of thermal expansion than bronze, seems to protrude from the sliding surface higher than the sintered layer. The protruding resin then flows onto the sintered layer and adheres to said layer. When the solid lubricant is less than 30%, the bonding strength due to the resin is high. In this case, the flowing and adhesion of the resin as described above occur with difficulty. On the other hand, when the solid lubricant is more than 70%, since the bonding strength due to the resin is weak, the wear of the additives occurs at a greater rete as compared with the flow and adhesion of the resin. This means that wear resistance is impaired.

The resin filled in the pores therefore not only bonds the solid lubricant but also causes adhesion of the additives on the exposed sintered layer, which adhesion is effective in enhancing the wear resistance and seizure resistance.

Generally speaking, the molybdenum disulfide ($MoS_2$) has a smaller particle diameter than the graphite. The molybdenum disulfide is a hexagonal crystal which is liable to cleave. The particles of molybdenum disulfide adhered to the sintered layer, is divided finely by the shear stress generated due to friction between the shaft and bearing. The so-finely divided is particles lubricate between the shaft and bearing. Because of these properties of the molybdenum disulfide, it cannot improve the wear resistance as effectively as graphite does. Meanwhile, graphite is similar to molybdenum disulfide in that it has hexagonal crystals whose cleavage is easy. The former is, however, harder and greater in particles than the latter. The bonding strength between resin and graphite is high. Because of these properties, wear resistance can be effectively enhanced by the graphite. Both wear resistance and seizure resistance are synergistically improved by using both graphite and molybdenum disulfide.

The present invention is described hereinafter with reference to the examples and comparative examples.

EXAMPLE 1

Spheroidal lead-bronze powder having a composition of 80% of Cu, 10% of Sn and 10% of Pb, polyamide-imide (a product of Hitachi Kasei, Hl-500 or HpC-6000-26), graphite (product of Tokai Carbon, G152 or TGP-15), and $MoS_2$ (a product of Sumiko Lubricating Inc., PA powder) were used to produce by the above described method various sliding materials, whose machining depth was 100 μm and whose exposed area of the sintered layer was 75% by area. Flat-sheet samples were prepared from the slidng materials and were brought into the line contact with the opposed material, which was a cylindrical rotating shaft (quenched S45C).

The testing conditions were as follows.
(1) Wear-resistant Test
Load: 10 kg
Speed: 2 m/sec
Lubrication: 5 cc/min (oil supply)
Kind of oil: paraffin oil
Sliding distance: $1.44 \times 10^4$ m
(2) Seizure-resistance Test
Load: 10 kg
Speed: 4 m/sec
Lubrication: after supplying oil at a rate of 0.1 cc/min the oil supply was cut.
Kind of oil: paraffin oil For the purpose of reference, the testing conditions in Japanese Examined Patent Publication No. 63-37445 referred hereinabove are given.
Load: 250 g
Speed: 0.052 m/sec
Lubrication: grease it is apparent from the comparison of this condition with the conditions (1) and (2) that the testing conditions according to the present invention are under a high load, high speed and severe lubrication conditions. These testing conditions are boundary lubricating condition. As a result of the tests, the following wear-amount (volume wear in $mm^3$) and seizure time (time after the oil cut to seizure) were obtained.

TABLE 1

| Materials | | Wear Amount ($mm^3$) | Seizure Time (min) |
|---|---|---|---|
| Inventive A | | | |
| $MoS_2$ | (wt %) 25 | 0.08 | 55 |
| Graphite | (wt %) 25 | | |
| Polyamide imide | (wt %) 50 | | |
| Inventive B | | | |
| $MoS_2$ | (wt %) 40 | 0.1 | 60 |
| Graphite | (wt %) 10 | | |
| Polyamide imide | (wt %) 50 | | |
| Comparative A | | | |
| $MoS_2$ | (wt %) 50 | 0.9 | 50 |
| Polyamide imide | (wt %) 50 | | |
| Comparative B | | | |
| Graphite | (wt %) 50 | 0.08 | 20 |
| Polyamide imide | (wt %) 50 | | |
| Comparative C | | | |
| $MoS_2$ | (wt %) 10 | 0.3 | 16 |
| Graphite | (wt %) 10 | | |
| Polyamide imide | (wt %) 80 | | |

Another test was carried out under the following conditions.
(b 3) Seizure resistance test
Load: 10 kg
Speed: 4 m/sec
Lubrication: After mist-lubrication for 5 minutes, the supply of mist was cut
Testing time: 2 hours

TABLE 2

| Materials | | Seizure time (min) |
|---|---|---|
| Inventive C | | |
| $MoS_2$ | 20 wt % | more than 120 |
| Graphite | 20 wt % | |
| Phenol | 60 wt % | |
| Inventive D | | |
| $MoS_2$ | 20 wt % | more than 120 |
| Graphite | 20 wt % | |
| Polyamide imide | 60 wt % | |
| Comparative D | | |
| Lead bronze | | 10 |

As is apparent from the above test results, the wear resistance of the inventive examples, in which both molybdenum disulfide and graphite are used in an amount of 50% or more, is excellent.

EXAMPLE 2

The Inventive Material A, mentioned above, was prepared to exhibit various values on the exposed area of the sintered layer. The seizure resistance, wear resistance and coefficient o of friction of the so-prepared samples were measured under the above described testing conditions except for the lubrication. The lubrication was set so that mixed oil containing 1 volume of ice machine oil and 9 volumes of light oil was fed as mist for 5 minutes, and then the oil supply was cut. The test results are shown in FIGS. 1 through 3.

Figure 1:
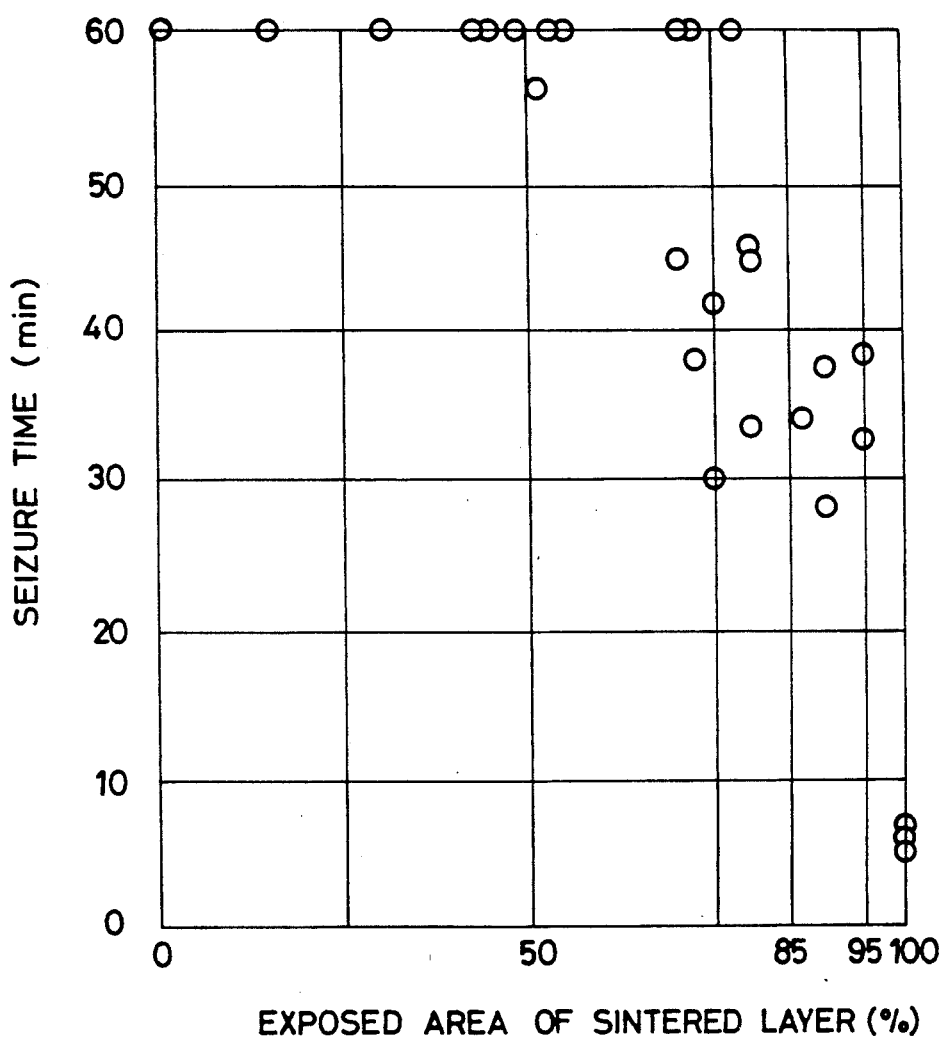
FIG. 1 is a graph illustrating the relationship between the exposed area of the sintered metal layer and the seizure time.

As is apparent from FIG. 1, seizure-resistance decreases drastically when the exposed area of the sintered layer exceeds 95%. The seizure resistance is stable when the exposed area of the sintered layer is 80% or less.

Figure 2:
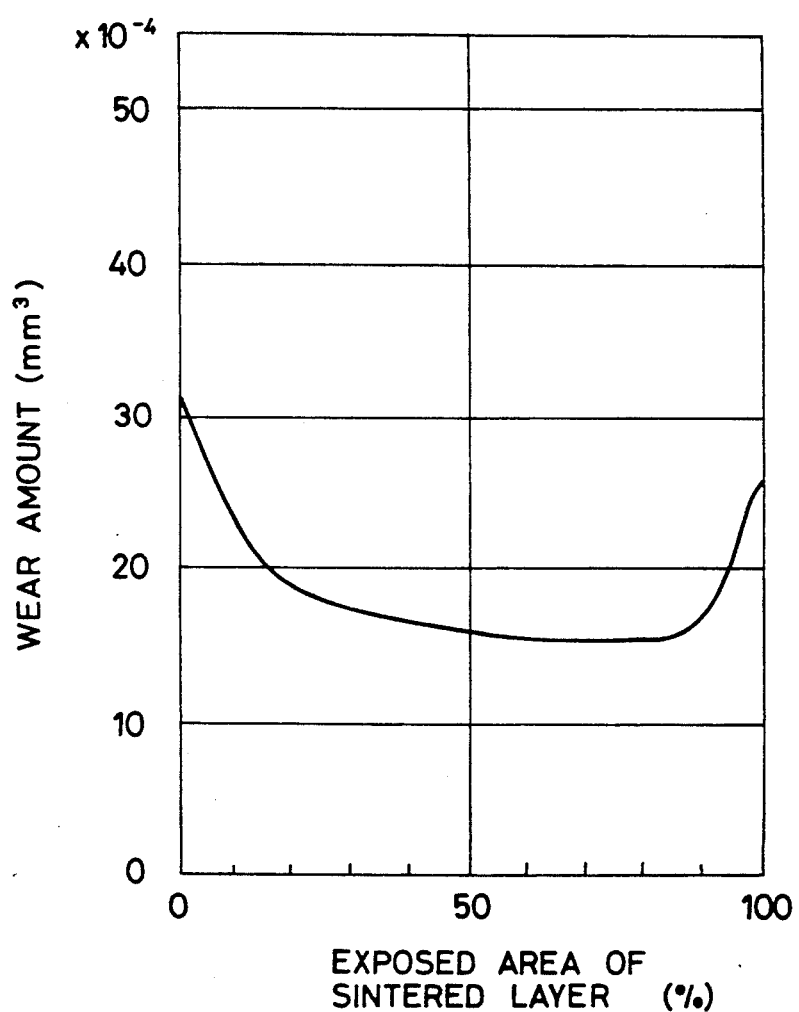
FIG. 2 is a graph illustrating the relationship between the exposed area of the sintered metal layer and the amount of wear.

As is apparent from FIG. 2, the wear amount increases when the exposed area of the sintered layer is less than 10%. This is because the resin and solid lubricant are liable to separate from the sliding surface when the exposed area of the sintered layer is small. On the other hand, when the exposed area of the sintered layer is more than 90%, the wear amount increases. This is because seizure tends to occur.

Figure 3:
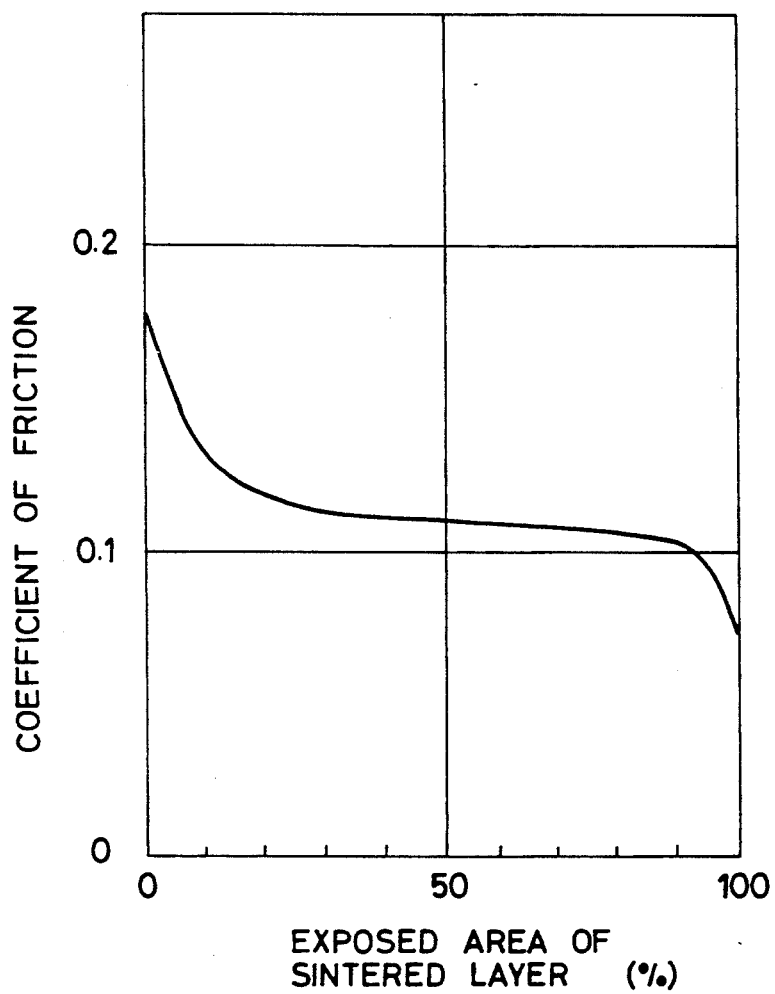
FIG. 3 is a graph illustrating the relationship between the exposed area of the sintered metal layer and the coefficient of friction.

As is apparent from FIG. 3, the coefficient of friction increases when the exposed area of the sintered layer is less than 10%. This is because the resin is liable to separate from the sliding surface when the exposed area of the sintered layer is small. This separation occurs in such a manner that lumps of resin are scraped from the sliding surface. On the other hand, when the exposed area of the sintered layer is more than 90%, the coefficient of friction decreases. This is because, along with the increase in the wear amount, the sliding surface increases to reduce the surface pressure. Under this condition, the lubricating condition shifts toward fluid lubrication, under which the coefficient of friction is low.

EXAMPLE 3

The sliding materials having the compositions given in Table 1 were produced by the method described above. Wear resistance and seizure resistance were tested by the methods described above.

The physical properties of the sliding layer were as follows.

(1) Thickness of sliding layer: 200 μm
(2) Porosity: 35% (volume)
(3) Exposed area of sintered layer: 70% (area)
(4) particle diameter of sintered metals: 110 μm (average)

The test results are given in Table 3.

TABLE 3

| No. | Resin (%) | $MoS_2$ (%) | Graphite (%) | Others (%) | Wear Resistance ($mm^3$) | Seizure Resistance (min) |
|---|---|---|---|---|---|---|
| 1 | PAI = 20 | 50 | 30 | — | 0.12 | 74 |
| 2 | PAI = 20 PESI = 20 | 40 | 20 | — | 0.09 | 66 |
| 3 | PAI = 50 | 10 | 40 | — | 0.08 | 57 |
| 4 | PAI = 50 | 25 | 25 | — | 0.08 | 60 |
| 5 | PAI = 50 | 40 | 10 | — | 0.10 | 62 |
| 6 | PAI = 50 | 48 | 2 | — | 0.25 | 67 |
| 7 | PAI = 60 | 20 | 20 | — | 0.12 | 50 |
| 8 | PI = 60 | 35 | 5 | — | 0.19 | 60 |
| 9 | PEI = 70 | 15 | 15 | — | 0.15 | 60 |
| 10 | PAI = 70 | 20 | 10 | — | 0.17 | 52 |
| 11 | PI = 20 | 50 | 11 | Pb = 19 | 0.11 | 77 |
| 12 | PAI = 30 | 27 | 40 | BN = 3 | 0.09 | 59 |
| 13 | PAI = 50 | 20 | 20 | PTFE = 10 | 0.09 | 66 |
| 14 | PAI = 50 | 40 | 2 | $WS_2$ = 2 BN = 2 PTFE = 2 Pb = 2 | 0.23 | 65 |
| 15 | PESI = 50 | 30 | 10 | $WS_2$ = 10 | 0.09 | 59 |
| 16 | PI = 5 PAI = 45 | 10 | 35 | BN = 5 | 0.08 | 59 |
| 17 | PAI = 50 | 15 | 20 | $WS_2$ = 5 PTFE = 10 | 0.08 | 62 |
| 18 | PAI = 20 | 20 | 15 | PTFE = 5 | 0.12 | 74 |
| 19 | PEI = 60 | 10 | 15 | BN = 2 PTFE = 3 | 0.12 | 56 |
| 20 | PAI = 70 | 15 | 10 | PTFE = 5 | 0.15 | 54 |
| 21 | PAI = 50 | 50 | — | — | 0.15 | 60 |
| 22 | PAI = 50 | — | 50 | — | 0.09 | 20 |
| 23 | PAI = 80 | 10 | 10 | — | 0.38 | 16 |
| 24 | Ph = 60 | 20 | 20 | — | 0.12 | 50 |

We claim:

1. A sliding material comprising a metal backing; and a layer comprising multi-layers of sintered Cu or Cu-alloy particles 30 to 200 μm in diameter deposited on the metal backing; said layer having from 5 to 70% by volume of pores filled with additives comprising a resin and solid lubricant, said lubricant comprising from 30 to 80% by weight of molybdenum disulfide and graphite based on weight of the additives; wherein the surface of said layer is machined and contains 30-95% of said Cu or Cu-alloy and the balance is said additives.

2. A sliding material comprising a metal backing and a layer comprising layers of sintered Cu or Cu-alloy particles 30 to 200 μm in diameter deposited on the metal backing; said layer having from 5 to 70% by volume of pores filled with additives comprising a resin and a solid lubricant, said lubricant consisting of from 30 to 80% by weight of molybdenum disulfide and graphite and from 3 to 20% by weight of a at least one member selected from the group consisting of tungsten disulfide, BN, fluorine plastics, and Pb based on weight of the additives; wherein the surface of said layer is machined and contains 30-95% of said Cu or Cu-alloy based on the surface area of the machined surface and the balance is said additives.

3. A sliding material according to claim 1 or 2, wherein said machined surface comprises 85% or less of said Cu or Cu-alloy.

4. A sliding material according to claim 3, wherein said machined surface comprises from 30 to 80% of said Cu or Cu-alloy.

5. A sliding material according to claim 1 or 2, wherein said additives comprise from 35 to 55% by weight of molybdenum disulfide and graphite.

6. A sliding material according to claim 5, wherein said molybdenum disulfide is filled in the pores of the sintered Cu or Cu-alloy in an amount cf from 10 to 50% by weight based on the weight of the additives and the Cu or Cu alloy.

7. A sliding material according to claim 6, wherein said molybdenum disulfide is filled in the pores of the sintered Cu or Cu-alloy in an amount of from 15 to 35% by weight based on the weight of the additives and the Cu or Cu alloy.

8. A sliding material according to claim 5, wherein said graphite is filled in the pores of the sintered Cu or Cu-alloy in an amount of from 2 to 40% by weight based on the weight of the additives and the Cu or Cu alloy.

9. A sliding material according to claim 8, wherein said graphite is filled in the pores of the sintered Cu or Cu-alloy in an amount of from 15 to 30% by weight based on the weight of the additives and the Cu or Cu alloy.

10. A sliding material according to claim 1 or 2, wherein said additives comprise from 20 to 70% by weight of the resin.

11. A sliding material according to claim 10, wherein said resin is selected from the group consisting of aromatic polyimide resin and a modified resin of aromatic polyimide resin.

12. A sliding material according to claim 10, wherein said resin is phenol resin.

13. A sliding material according to claim 1 or 2, wherein said porosity is from 10 to 60%.

14. A sliding material according to claim 13, wherein said porosity is from 30 to 50%.

15. A sliding material according to claim 1 or 2, wherein said Cu or Cu-alloy particles comprises irregularaly shaped particles having an average-long diameter of from 30 to 200 $\mu$m.

16. A sliding material according to claim 15, wherein 50% or more of said alloy particles is said irregularly shaped particles, whose ratio of short-diameter/long-diamter is from 0.2 to 0.7.

17. A sliding material according to claim 1 or 2, produced by sintering said Cu or Cu-alloy onto the metal backing, impregnating the pores of sintered Cu or Cu-alloy with said additives, and then machining the surface of the sintered layer to a depth of at least 100 $\mu$m.

* * * * *